Patented Feb. 16, 1932

1,844,943

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing.  Application filed October 27, 1928. Serial No. 315,587.

This invention relates to the treatment of rubber, and similar vulcanizable materials such as gutta percha and balata, and particularly to a process of treating rubber or rubber articles to retard their vulcanization, and/or cracking, especially when under tension in sunlight. It further relates to the product of such a process.

It has been found that esters of acids whose dissociation constant are equal to or greater than $6.6 \times 10^{-5}$ have the property of retarding vulcanization of unvulcanized rubber or of retarding further vulcanization of vulcanized rubber; also that they retard cracking of vulcanized rubber. Among the esters that may be employed are ethyl oxalate, normal butyl oxalate, iso amyl oxalate, ethyl monochloracetate, butyl malate, ethyl maleate, ethyl para toluene sulfonate, normal butyl citrate, ethyl salicylate, ethyl succinate, isopropyl benzoate, triortho cresyl phosphate. According to Landolt-Bornstein Physikalisch-Chemische Tabellen 5, Auflage (1923) p. 1123 ff, the dissociation constants of the corresponding acids are:

| Acid | Temp. | Value |
|---|---|---|
| Oxalic acid | 25° C. | $3.8 \times 10^{-2}$ |
| Monochloracetic acid | 25° C. | $1.55 \times 10^{-3}$ |
| Maleic acid | 25° C. | $1.5 \times 10^{-2}$ |
| Tartaric acid | 25° C. | $9.7 \times 10^{-4}$ |
| Para toluene sulfonic acid | 25° C. | $1 \times 10^{-1}$ |
| Citric acid | 25° C. | $8.2 \times 10^{-4}$ |
| Salicylic acid | 25° C. | $1.0 \times 10^{-3}$ |
| Succinic acid | 25° C. | $6.6 \times 10^{-5}$ |
| Benzoic acid | 25° C. | $6.6 \times 10^{-5}$ |
| Phosphoric acid | 25° C. | $9 \times 10^{-3}$ |

In repairing a tire, which involves heating a vulcanized piece of rubber in contact with the repair stock, treatment of the portion around the repair with ethyl oxalate will retard its further vulcanization, i. e. retard over vulcanization, and also improve the adhesion of the repair stock to the original tire. In the course of such treatment where expansion cores are used to inflate the tires to be repaired, if the core is treated with a benzol solution of ethyl oxalate its resistance to surface cracking may be improved by about 500%. Vulcanized articles treated with a benzol solution of butyl oxalate show a considerably improved resistance to cracking when under tension in the sun. Where it is desired to leave a portion of a stock unvulcanized, or its vulcanization retarded, e. g. fabricating footwear from vulcanized sheets,—such portion may be treated with ethyl oxalate. Also where rubbers contain excess basic material, inorganic or organic, ethyl oxalate may be employed to neutralize the excess. Premature vulcanization of rubber stock, and surface over-vulcanization as in the case of large rubber articles, may be retarded by treatment with ethyl oxalate.

The following examples further illustrate the invention:

Example 1

Water bag stock which contains 100 parts pale crepe rubber, 39 parts carbon black, 15 parts zinc oxide, 6 parts pine tar, 2 parts tetramethylthiuramdisulphide and .5 part sulphur was vulcanized for 60' under 40 pounds steam pressure. Then a piece of this stock 1/10" thick was allowed to soak over night in a 10% solution of ethyl oxalate in benzol. The benzol was allowed to evaporate out. The stock was then embedded in an unvulcanized mixture of 100 parts of rubber and 10 parts of sulphur and vulcanized for 4 hours under 40 lbs. steam pressure. At the end of this time the treated bag stock did not become hard. When a water bag stock which had not been treated with ethyl oxalate was similarly treated it became so hard it could not be bent without breaking. The treated bag stock may be used with fresh unvulcanized mixture as high as three times before is becomes hard. And if the bag stock is re-treated with ethyl oxalate in benzol after each use it resists hardening even better. This shows that the bag stock resists over-vulcanization from sulphur that may migrate into the bag stock and therefore cause it to crack on the surface. This resistance, it is believed, is due to the ethyl oxalate either combining with or neutralizing the nitrogeneous or basic material in the rubber. It has also been observed that after vulcanization the two stocks referred to above adhere to each other particularly well after the ethyl oxalate treatment.

*Example 2*

A stock containing 100 parts of pale crepe, 10 parts of zinc oxide, 3 parts of sulphur, .3 part of diluted heptaldehyde-aniline condensation product prepared at 140° C. and 2 parts of ethyl oxalate was heated in a mold under 40 lbs. steam pressure for 60'. No appreciable vulcanization was observed; but when the ethyl oxalate was omitted, the stock vulcanized well. Stocks or portions of stocks may thus be treated with ethyl oxalate to retard their normal vulcanization.

If any of the other materials mentioned are used in place of ethyl oxalate, similar results may be obtained in greater or less degree. It is further understood that while in the example given certain vulcanizing ingredients are disclosed, the invention is not limited to the use of these but it may be carried out by the use of other suitable material.

The term "rubber" as claimed is to be interpreted in a broad sense to cover synthetic rubber, and such as gutta percha and balata.

Also with the detailed disclosure above given it is obvious that modifications will suggest themselves and it is not desired to limit the invention otherwise than as set forth in the appended claims.

Having thus described my invention what I claim and desire to protect by Letters Patent is:

1. The process of treating rubber which comprises treating a rubber stock with an ester of an acid having a dissociation constant equal at least to $6.6 \times 10^{-5}$ at 25° C.

2. The process of treating rubber which comprises treating a rubber stock with an ester of an acid having a dissociation constant greater than $6.6 \times 10^{-5}$ at 25° C.

3. The process of treating rubber which comprises treating a rubber stock with an ester of oxalic acid.

4. The process of treating rubber which comprises treating a rubber stock with ethyl oxalate.

5. The process of treating rubber which comprises retarding the vulcanization of a rubber stock by supplying to said stock an ester of an organic acid having a dissociation constant equal to at least $6.6 \times 10^{-5}$ at 25° C.

6. The process of treating rubber which comprises retarding the vulcanization of a rubber stock by supplying to said stock ethyl oxalate.

7. The process of treating rubber which comprises retarding the vulcanization of a portion of a rubber stock by supplying to said portion an ester of an organic acid having a dissociation constant equal to at least $6.6 \times 10^{-5}$ at 25° C.

8. The process of treating rubber which comprises retarding the vulcanization of a portion of a rubber stock by supplying to said portion ethyl oxalate.

9. The process of treating rubber which comprises retarding the further vulcanization of a vulcanized portion of a rubber stock in the presence of a contiguous portion of unvulcanized rubber stock by supplying to the vulcanized rubber stock an ester of an organic acid having a dissociation constant equal to at least $6.6 \times 10^{-5}$ at 25° C.

10. A process of treating rubber which comprises retarding the vulcanized stock by supplying to said stock a material selected from the group ethyl oxalate, normal butyl oxalate, iso amyl oxalate, ethyl monochloracetate, butyl malate, ethyl maleate, ethyl para toluene sulfonate, normal butyl citrate, ethyl salicylate, ethyl succinate, iso-propyl benzoate, triortho cresyl phosphate.

11. A process of treating rubber which comprises treating a rubber stock with a material selected from the group ethyl oxalate, normal butyl oxalate, iso amyl oxalate, ethyl monochloracetate, butyl malate, ethyl maleate, ethyl para toluene sulfonate, normal butyl citrate, ethyl salicylate, ethyl succinate, iso-propyl benzoate, triortho cresyl phosphate.

12. A rubber product comprising rubber treated with an ester of an acid having a dissociation constant equal at least to $6.6 \times 10^{-5}$ at 25° C.

13. A rubber product comprising rubber treated with an ester of an acid having a dissociation constant greater than $6.6 \times 10^{-5}$ at 25° C.

14. Rubber derived from rubber treated with an ester of oxalic acid.

15. Vulcanized rubber derived from rubber treated with an ester of oxalic acid.

16. Rubber derived from rubber treated with ethyl oxalate.

17. Vulcanized rubber derived from rubber treated with ethyl oxalate.

18. Rubber derived from rubber treated with a material selected from the group ethyl oxalate, normal butyl oxalate, iso amyl oxalate, ethyl monochloracetate, butyl malate, ethyl maleate, ethyl para toluene sulfonate, normal butyl citrate, ethyl salicylate, ethyl succinate, iso-propyl benzoate, triortho cresyl phosphate.

19. Vulcanized rubber derived from rubber treated with a material selected from the group ethyl oxalate, normal butyl oxalate, iso amyl oxalate, ethyl monochloracetate, butyl malate, ethyl maleate, ethyl para toluene sulfonate, normal butyl citrate, ethyl salicylate, ethyl succinate, iso-propyl benzoate, triortho cresyl phosphate.

Signed at Passaic, county of Passaic, State of New Jersey, this 22 day of October, 1928.

SIDNEY M. CADWELL.